United States Patent [19]
Orain

[11] 3,955,861
[45] May 11, 1976

[54] OSCILLATING BEARING SUPPORTS
[75] Inventor: Michel Orain, Conflans-Sainte-Honorine, France
[73] Assignee: Societe Anonyme dite: Glaenzer Spicer, Poissy, France
[22] Filed: Oct. 18, 1974
[21] Appl. No.: 515,920

[30] Foreign Application Priority Data
Dec. 26, 1973  France .............................. 73.46343

[52] U.S. Cl. .......................... 308/189 R; 308/205; 180/70 P
[51] Int. Cl.² ........................................ F16C 13/00
[58] Field of Search ............... 308/29, 72, 140, 194, 308/189, 205, 207, 26, 27, 28, 184; 248/6, 7, 26, 16, 49, 55; 180/70 P; 267/136, 141; 64/1 R, 3, 4

[56] References Cited
UNITED STATES PATENTS

| | | | |
|---|---|---|---|
| 2,081,237 | 5/1937 | Jantsch ............................ | 180/70 R |
| 2,102,415 | 12/1937 | Herreshoff ....................... | 180/70 P |
| 2,857,974 | 10/1958 | Heller ............................... | 180/70 P |
| 2,893,790 | 7/1959 | Raes et al. ........................ | 180/70 P |
| 3,047,345 | 7/1962 | Burton et al. .................... | 180/70 P |

*Primary Examiner*—Robert R. Song
*Assistant Examiner*—Richard A. Bertsch
*Attorney, Agent, or Firm*—Baldwin, Wight & Brown

[57] ABSTRACT

An oscillating bearing support for supporting an intermediate shaft of a power transmission with universal joints particularly in motor vehicles. An inner sleeve supports the shaft for rotation therein. An outer support sleeve is fixed to a fixed support. The facing surfaces of the inner and outer sleeves are provided with adjacent circular grooves generally concentric with the axis of the shaft in its rest position. An elastomeric toroidal member is provided wth ribs cooperable with the grooves of the sleeves and concentric with its center line. The toroidal member is fitted on the inner sleeve and compressed between the inner and outer sleeves. Radially projecting portions at the ends of one of the sleeves cooperate with plain cylindrical portions at the ends of the other sleeve for axially retaining the inner sleeve relative to the outer sleeve. The toroidal member may be formed in segments. The grooves in the inner and outer sleeves may be screw threads. The inner and outer sleeves may be formed out of tubular sheet metal blanks.

12 Claims, 11 Drawing Figures

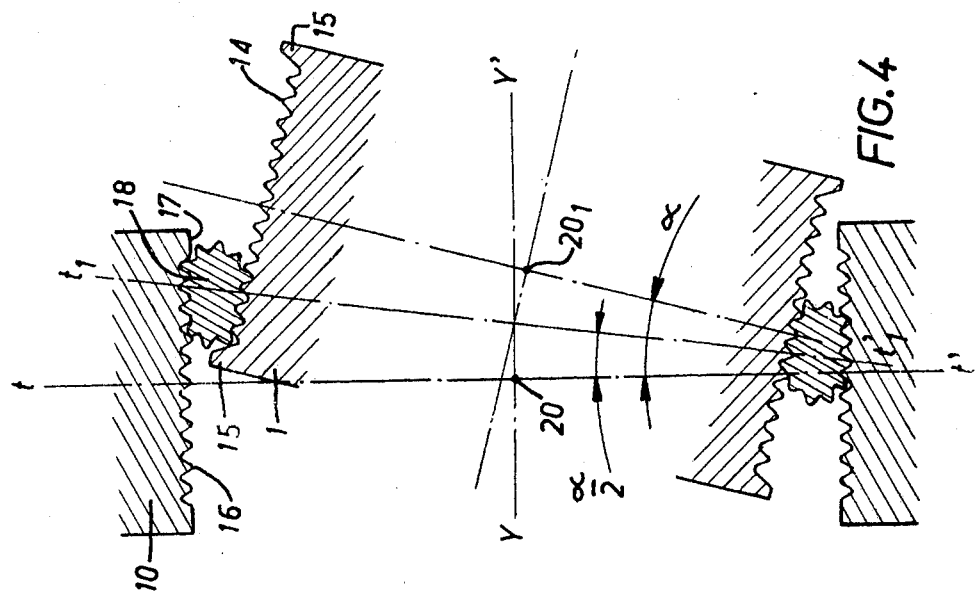
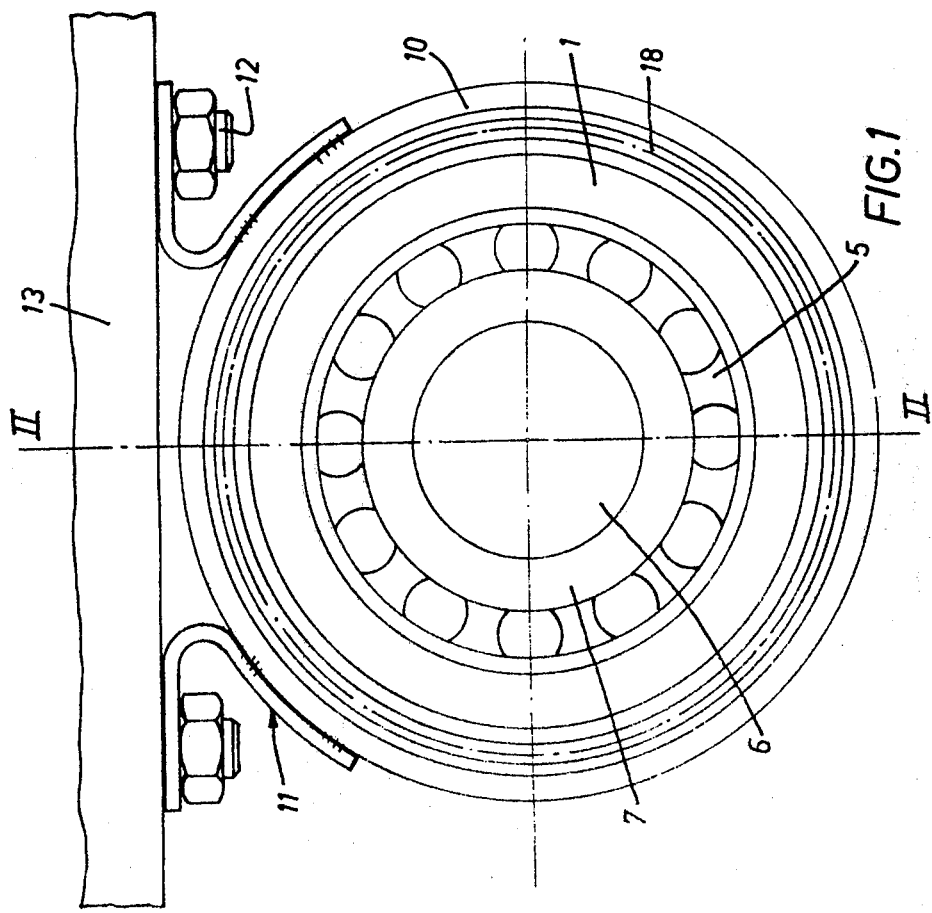

OSCILLATING BEARING SUPPORTS

The present invention relates to an oscillating bearing support for use, in particular, as an intermediate bearing support for the intermediate shaft of a power transmission with universal joint assemblies disposed between a driving and a driven shaft with interposed intermediary shafts.

When the power transmission shafting with a universal joint between the gear box and the differential, for example, includes more than one shaft, it is necessary to support the universal joint assemblies by one or two intermediate bearing supports between the driving shaft on the gear box side and the driven shaft at the opposite side next to the differential. As the distance and the relative position between the driving and driven shafts vary generally in use, the intermediate bearing support must allow for changes of inclination of the shafts and their axial displacement. Further, as the intermediate bearing support(s) are used to support the universal joint assemblies, they must maintain the shafts in a position which is radially fixed with respect to the frame of the vehicle. This is also the case when dealing with machines other than an automobile which is only the must common example in the field of application of the invention.

Such bearing supports must, in addition, have the following characterics:

1. Radial rigidity sufficient to avoid deleterious resonant vibrations even when operating at the highest speeds of rotation for such transmissions.
2. Total elimination of play between the component parts of the intermediate bearing support to eliminate the ever-present possibility of noise;
3. Damping of high frequency vibrations;
4. Very low production and assembly costs.
5. Long service life with intensive use and without maintenance or lubrication;
6. Ease of oscillation, facility in moving to an angular position, and durability of sliding movement, independent of atmospheric conditions, corrosiveness, spraying of mud, etc.
7. Robustness in all respects to withstand radial forces developed by complementary torque of the universal joints when running at a large angle and transmitting high torque, and especially when the distance between the universal joints are short.

The need to obtain simultaneously all the above-stated characteristics poses a very complicated problem to resolve which up to now has not been achieved.

An object of the invention is a support bearing which provides a solution to this problem which is as complete as possible and which is also of both great simplicity and very economical.

The bearing support according to the invention comprises an inner member arranged to support a transmission shaft for rotation and having a substantially cylindrical outer surface, a fixed outer support member having a substantially cylindrical internal bore, adapted to received said inner member with a degree of freedom necessary for oscillating movement, the outer surface of the inner member and the internal surface of the bore of the support member having adjacent circular grooves of substantially the same size disposed transversely of the longitudinal axes of said surface and bore, and a toroidal member of elastic material having along its outer surface adjacent circular ribs disposed concentric to the center line of the toroidal member and adapted to mesh with the grooves formed in the inner member and the outer support member, said toroidal member being engaged about the inner member and compressed between the inner member and the outer support member.

Other advantages and features of the invention will become apparent from the rest of the description, given by way of non limiting examples with reference to the accompanying drawings, in which:

FIG. 1 is a front view of a first embodiment of the bearing support according to the invention in the rest position, i.e., the position in which the axis of the intermediate shaft to be supported and the outer support member, if not coincident, are at least parallel;

FIG. 4 is a schematic view in diametrical cross-section of the main parts of the same bearing support, the transmission shaft is at an angle $\alpha$ with respect to the outer support member;

Figure 2:
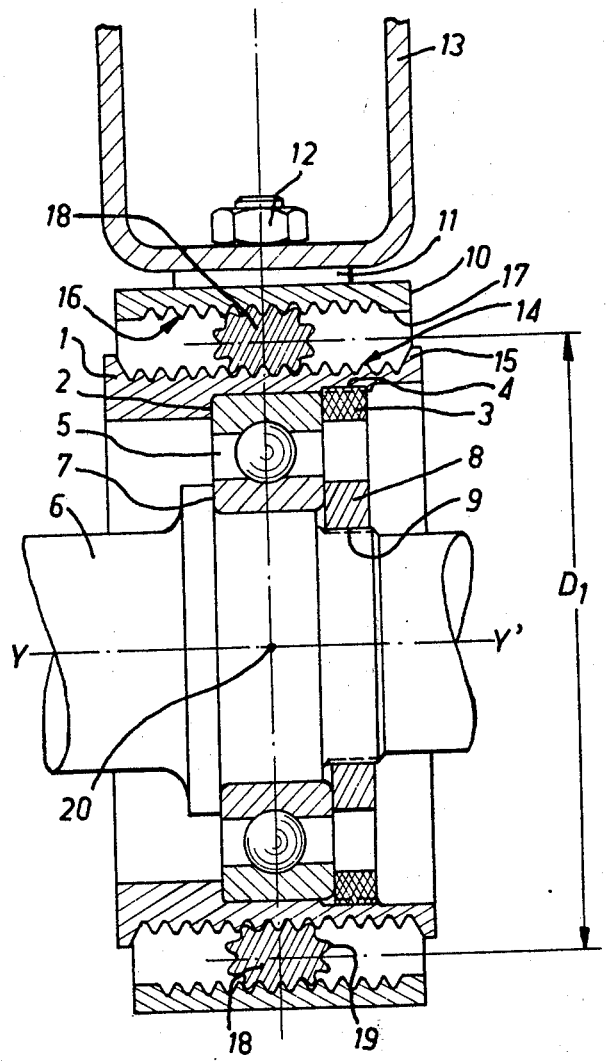
FIG. 2 is a cross-section taken on the line II—II in FIG. 1.

The intermediate bearing support as shown in FIGS. 1–4 comprises an inner sleeve member 1 in which an inner shoulder 2 and a tapped bore 4 axially spaced therefrom are formed. The outer race of a ball bearing 5 is held in place between the shoulder 2 and a ring 3 threadedly engaging the tapped bore 4 in the sleeve 1. The inner race 6 received a shaft 6 to be supported by the bearing support and is maintained in place thereon between a collar 7 and an internally threaded ring 8 which threadedly engages the screw thread 9 on the shaft. An outer support member 10 is disposed about the sleeve member 1 and is also formed as a sleeve to which lugs 11 are welded. The lugs 11 are fixed by means of nuts and bolts 12 to a fixed support 13, for example a cross member of the chassis of an automobile having a power transmission with universal joints of which the shaft 6 is an intermediate shaft. Circular grooves 14 parallel to one another are formed on the outer surface of the inner sleeve member 1 and, in axial section, form a gear rack; the grooved portion of the sleeve member is bounded at each end by a flange 15 projecting outwardly. Similar grooves 16 of substantially the same size are formed on the inner surface of the support member 10, the grooved portion of the support member 10 being bounded at each end by plain cylindrical portion 17.

A toroidal member 18 (FIG. 3) formed of elastomeric material is interposed between the sleeve member 1 and the support member 10; ribs 19 are formed along the outer surface of the toroidal member so that in radial section gear wheel-like sections of the toroidal member are adapted to mesh with the grooves 14 and 16 in the sleeve member 1 and the support member 10.

As shown in FIG. 2, the respective diameters of the outer surface of the sleeve member 1 and the inner surface of the support member 10 and the cross-section of the toroidal member 18 are such that toroidal member is compressed between the sleeve member 1 and the support member 10. Further, the mean internal diameter Do (FIG. 3) of the toroidal member 18 in its uncompressed condition is smaller than the mean internal diameter $D_1$ (FIG. 2) of the same toroidal member when the bearing support is assembled and the toroidal member is elastically squeezed on the sleeve 1 and therefore stretched. Owing to this arrangement, the radial compression of the toroidal member 18 between the sleeve member 1 and the support member 10 causes only lateral flattening of the toroidal ring and not its circumferential compression which could cause the toroidal ring to buckle and would tend to allow it to escape from the teeth formed by the grooves 14 and 16 in the sleeve member 1 and the support member, especially when operating at an angle.

During the operation of the mechanism, for example a motor vehicle transmission, of which the shaft 6 is a part, when the shaft 6 changes its angle of inclination from the longitudinal axis $yy'$ of the support member 10, a change in the angle of inclination and longitudinal sliding displacement of the shaft 6 are produced simultaneously, and therefore of the sleeve member 1 with respect to the fixed support member 10; thus, the center 20 of the bearing 5 which is also the center of the sleeve member 1 takes the position $20_1$ (FIG. 4). This movement is made possible by the fact that the toroidal member 18 rolls between the sleeve member 1 and the support member 10. The rolling movement is controlled by the meshing of the ribs 19 of the toroidal member with the grooves 14 and 16 so that, if the median plane $tt'$ of the sleeve member 1 makes an angle $\alpha$ relative to its initial position, the median plane $t_1t'_1$ of the toroidal member 18 makes with its initial position only an angle $\alpha/2$ such that the degree of compression of the different sections of the toroidal ring 18 remain substantially constant.

In order to obtain simultaneously maximum ease of axial displacement and angular displacement of the shaft 6 with respect to the support member 10, it is advantageous to reduce the ratio of the diameter of the section of the toroidal member 18 to the mean diameter of the toroidal member; the amount of this ratio can be reduced, however, is limited by the necessity of avoiding interference between the sleeve member 1 and the support member 10 during the above-described movements of the shaft 6 with respect to the support member 10.

Furthermore, the elastic modulus of the elastomeric material forming the toroidal member 18 must be chosen sufficiently high, i.e., the elastomeric material must be sufficiently stiff so as to avoid the introduction of vibrations caused by the residual lack balance (in the shaft) even for high rotational speeds thereof.

The toroidal member 18 may be formed of another non elastomeric material without going beyond the scope of the present invention, however, the inherent properties of elastomeric materials provide a very high frequency vibration damping which is very effective for deadening noises, particularly when used in bearing supports in motor vehicles.

Figure 5:
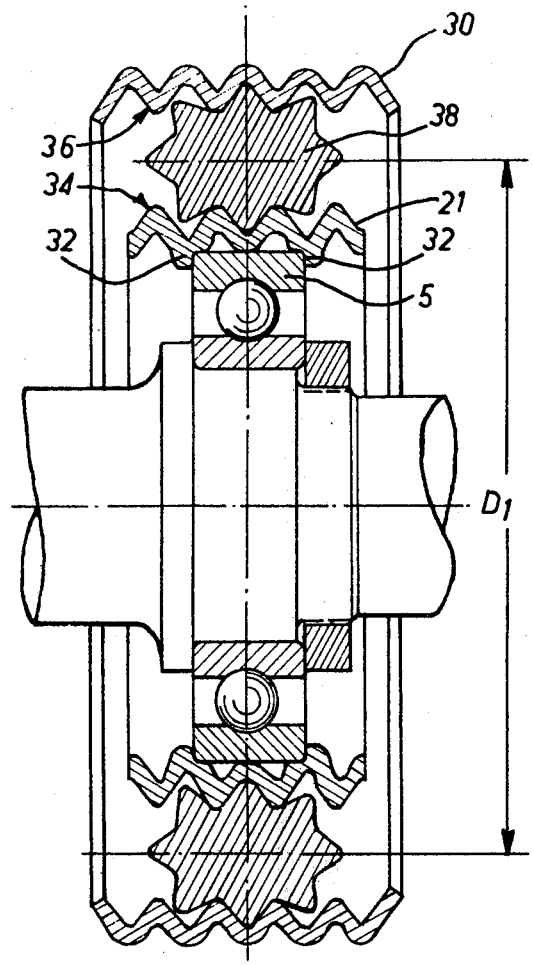
FIG. 5 is a cross-section taken on the line V—V, similar to that of FIG. 2.
Figure 6:
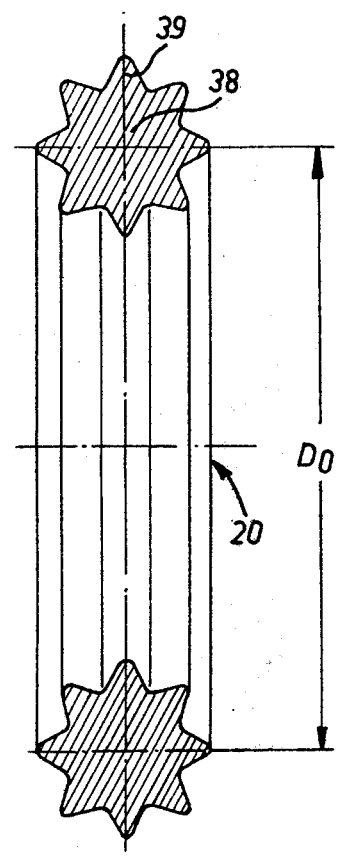
FIG. 6 is a diametral section of the elastic toroidal member used in the bearing support of FIG. 5.

For a given flexibility or ease in changing the angle of the shaft and axial displacement, a toroidal member having a cross-section of larger diameter, for example as shown in FIGS. 5 and 6 and described hereinbelow, could reduce the natural radial resonant frequency of the unit comprised of the intermediate bearing support and the mass of the corresponding transmission which it carries.

In order to introduce the toroidal member 18 into its service position, the toroidal member is previously rolled about itself, the inner sleeve member 1 brought almost entirely out of the internal bore in the outer support member so that when the sleeve member is returned to its rest position, as shown in FIG. 2, the cross-section of the toroidal member returns to its shape before it was brought into service position.

Although the inner sleeve member of the bearing support is stable in its median position, owing to the force of elasticity present in the toroidal ring during the change of angular inclination and axial displacement of the shaft, it is necessary to eliminate any possibility that the toroidal member might come out of engagement during assembly, storage or handling of the bearing support. For this reason the flanges 15 and the plain cylindrical portions 17 are employed as safety limit stops.

In the embodiment of FIGS. 5 and 6 where the same parts are designated by the same reference numerals and similar parts are designated by the same reference numerals plus twenty (20), the sleeve member 21 and the outer support member 30 are formed by tubular sheet metal blanks in which the grooves formed as threads 34 and 36 are obtained by milling or spinning the blanks. The bearing 5 is held in place in the sleeve member 21 by crimping or swaging the sleeve member 21 on to the outer race of the bearing as shown at 32. As for the toroidal ring 38 having ribs 39 adapted to mate with the threads 34 and 36, the diameter of the cross-section of the toroidal member is substantially larger than that of the previous embodiment as it has been specified.

The intermediate bearing support thus formed is of a particularly inexpensive construction without losing any of the previously described properties of bearing support according to the invention.

Figure 3:
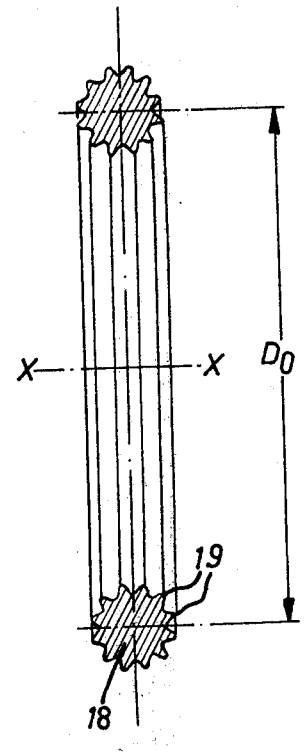
FIG. 3 is a diametrical cross-section of the elastic toroidal member.
Figures 7, 8:
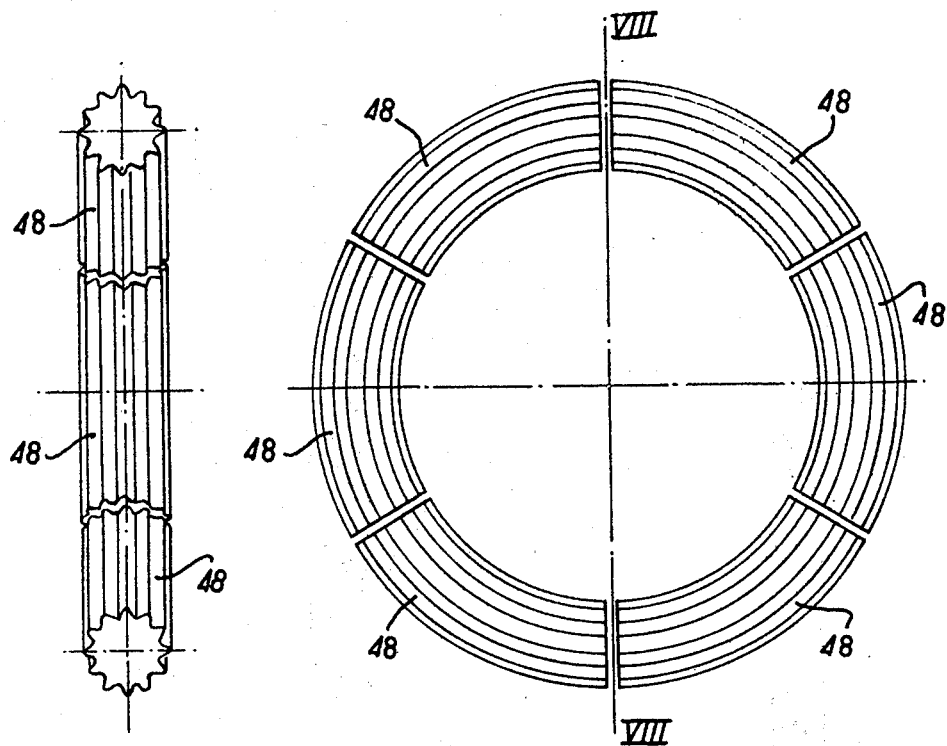
FIG. 7 is a front view of another embodiment of the elastic toroidal member.
FIG. 8 is a sectional view taken on the line VIII—VIII in FIG. 7.

Instead of using a continuous toroidal member such as illustrated in FIGS. 3 and 6, it is possible, as illustrated in FIG. 7, to employ plurality of toroidal segments 48.

Figure 9:
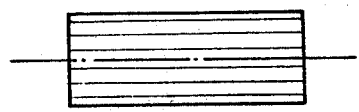
FIG. 9 is a side elevation view of the toroidal member in FIGS. 7 and 8, supposed to be rectilinearly developed.
Figure 10:
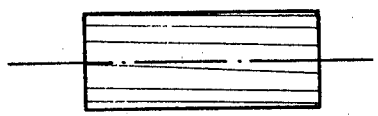
FIG. 10 is a variation of the member in FIG. 9.

In this case, which may also be possible for the previous embodiments, the ribs may be bodies of revolution with the axes coinciding with that of the complete toroidal ring as shown in FIGS. 7–9, or may be helical with a gradual pitch as shown in FIG. 10 for use in case the grooves of the sleeve member 1 or 21 and the support member 10 or 30 are formed as threads.

Figure 11:
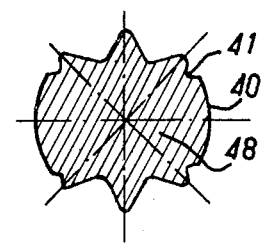
FIG. 11 is a cross-section of another embodiment of the elastic toroidal member usable in the bearing support according to the invention.

As shown in FIG. 11, it is also possible to provide non-grooved projecting portion 50 on the toroidal member 48 between two portions having ribs 49,$49_1$. The portions 50 act as limit stops for the rolling movements of the toroidal member, thereby replacing the portions 15,17 on the sleeve member and the support member of the embodiment of FIG. 1.

What I claim is:

1. An oscillating bearing support for supporting an intermediate shaft of a power transmission including universal joints, comprising an inner member supporting the intermediate shaft for rotation and having an outer substantially cylindrical surface, an outer member having a substantially cylindrical internal bore receiving said inner member with the freedom necessary to allow oscillating movement of said outer member, adjacent circular grooves on the outer surface of said inner member and along the internal bore of said outer member, all of said grooves being substantially the same size and extending transversely of the axes of the outer surface and the bore, and a toroidal member of elastic material having adjacent circular ribs along its outer surface concentrically of the center line of the toroidal member, said ribs meshing with the grooves of said inner and outer members, the toroidal member being engages about said inner member and compressed between said inner and outer members.

2. An oscillating bearing support according to claim 1, further comprising means for axially retaining said inner member relative to said outer member.

3. An oscillating bearing support according to claim 2, wherein the axial retaining means include non-grooved end portions on said inner and outer members, certain of said end portions being in the form of radially projecting flanges and others of said end portions being in the form of plain cylindrical portions.

4. An oscillating bearing support according to claim 1, wherein the toroidal member is elastically located on said inner member.

5. An oscillating bearing support according to claim 1, where the grooves of said inner and outer members are formed as screw threads.

6. An oscillating bearing support according to claim 1, wherein said inner and outer members are formed of sheet metal.

7. An oscillating bearing support according to claim 1, wherein the outer cylindrical surface of said inner member is substantially coaxial with the internal bore of said outer member.

8. An oscillating bearing support according to claim 1 wherein the grooved portions of at least one of said inner and outer members are bounded at each end by a plain cylindrical portion defining means for axially retaining said inner member relative to said outer member.

9. An oscillating bearing support according to claim 1 wherein the grooved portions of at least one of said inner and outer members are bounded at each end by a flange projecting radially from the respective member towards the other of said members, said flanges defining means for axially retaining said inner member relative to said outer member.

10. An oscillating bearing support according to claim 1 wherein said toroidal member has an outer surface including diametrically opposed portions free of ribs disposed between two diametrically opposed portions having said ribs, said portions free of ribs having substantially the same overall cross sectional diameter as that of said portions with ribs.

11. An oscillating bearing support according to claim 1 wherein the ratio of the cross sectional diameter of said toroidal member to the mean diameter of said toroidal member has a minimum permissible value while avoiding interference between said inner and outer members during maximum axial and angular displacements of the intermediate shaft.

12. An oscillating bearing support according to claim 1 wherein said toroidal member is in the form of a plurality of toriodal segments arranged end to end.

* * * * *